United States Patent [19]

Takehara et al.

[11] Patent Number: 5,048,633

[45] Date of Patent: Sep. 17, 1991

[54] INTEGRATED CONTROL SYSTEM FOR STEERING AND POWER UNIT

[75] Inventors: Shin Takehara, Higashihiroshima; Toshio Nakajima, Hatsukaichi; Shigefumi Hirabayashi, Hiroshima, all of Japan

[73] Assignee: Mazda Motor Corporation, Hiroshima, Japan

[21] Appl. No.: 464,810

[22] Filed: Jan. 16, 1990

[30] Foreign Application Priority Data

Jan. 18, 1989 [JP] Japan ................................. 1-9491

[51] Int. Cl.$^5$ .......................... B60K 28/16; B62D 5/04
[52] U.S. Cl. .................................... 180/197; 280/91; 364/424.05; 180/79.1
[58] Field of Search ................ 180/197, 140, 142; 280/91; 123/399; 364/424.05

[56] References Cited

U.S. PATENT DOCUMENTS

| 4,508,078 | 4/1985 | Takeuchi et al. | 123/399 |
| 4,520,777 | 6/1985 | Hatori et al. | 180/142 |
| 4,704,541 | 11/1987 | Leiber | 180/142 |
| 4,729,356 | 3/1988 | Kaneko et al. | 123/399 |
| 4,733,878 | 3/1988 | Kanazawa et al. | 280/91 |
| 4,866,623 | 9/1989 | Ise et al. | 180/197 |
| 4,881,613 | 11/1989 | Kanazawa et al. | 180/140 |
| 4,941,095 | 7/1990 | Imaseki et al. | 280/91 |

FOREIGN PATENT DOCUMENTS 0109177 4/1959 Japan ................................. 180/197
0220972 10/1986 Japan .

Primary Examiner—Charles A. Marmor
Assistant Examiner—Mitchell Bompey
Attorney, Agent, or Firm—Price, Heneveld, Cooper, DeWitt & Litton

[57] ABSTRACT

This invention discloses a control system for integrally controlling steering and a power unit of a vehicle includes: a front-wheel steering device for steering the front wheels of the vehicle in connection with the operation of a steering handle; a rear-wheel turning device for turning the rear wheels of the vehicle in connection with steering of the front wheels; an adjustment device for adjusting an engine output of the vehicle; a first detection device for detecting an amount in which an accelerator member is operated; a driving device for driving the engine output adjustment device in response to the amount in which the accelerator member is operated; a second detection device for detecting either an instruction given by a driver who wants to change a travel characteristic or changes in an environment in which the vehicle is running; and a change/correction device for changing or correcting a control characteristic which controls the rear-wheel turning device and the driving device in response to an output of the second detection device.

11 Claims, 7 Drawing Sheets

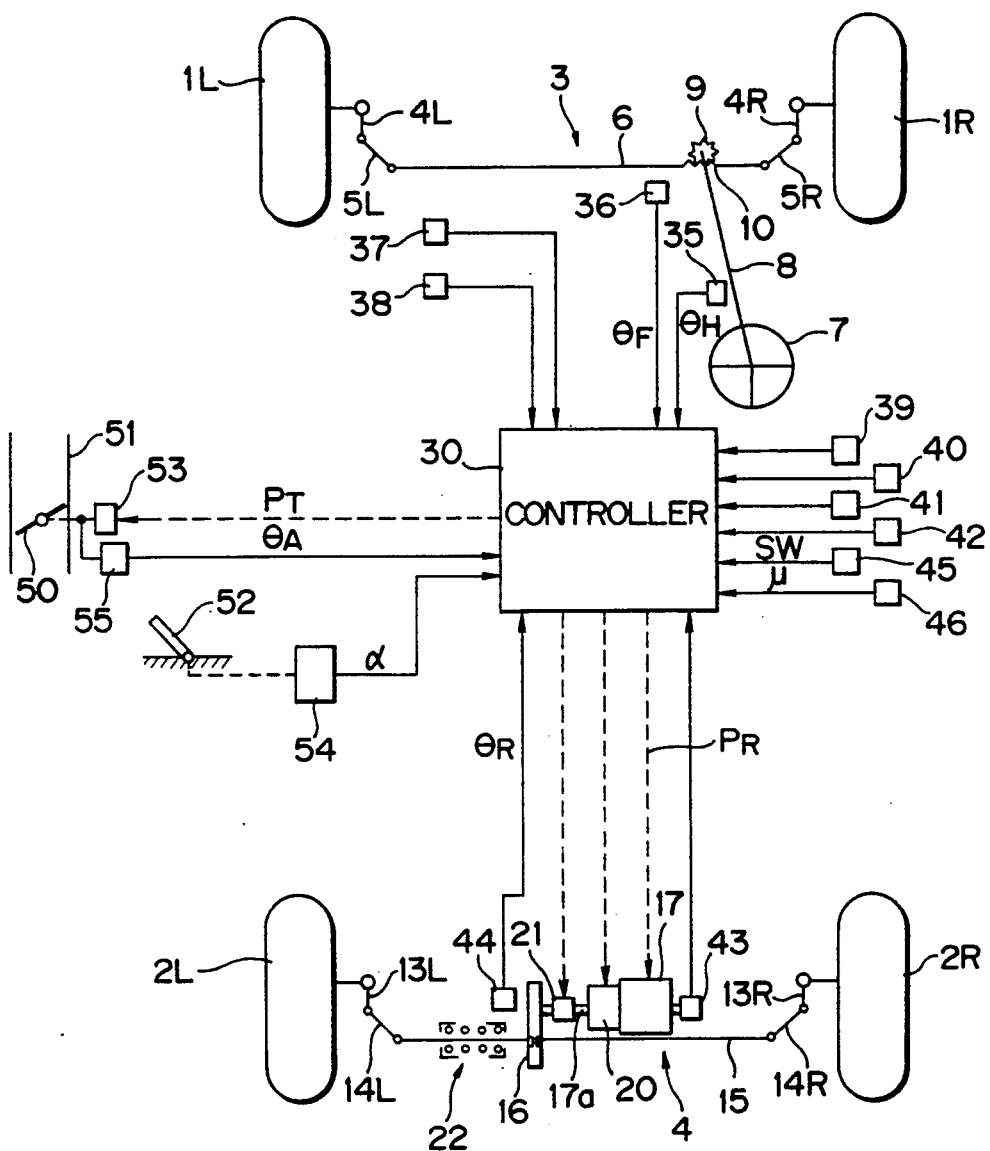
F I G. 1

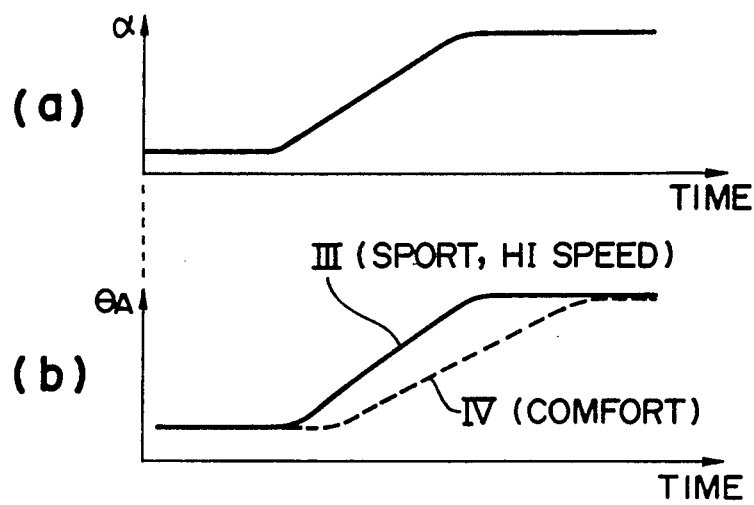
F I G. 7A
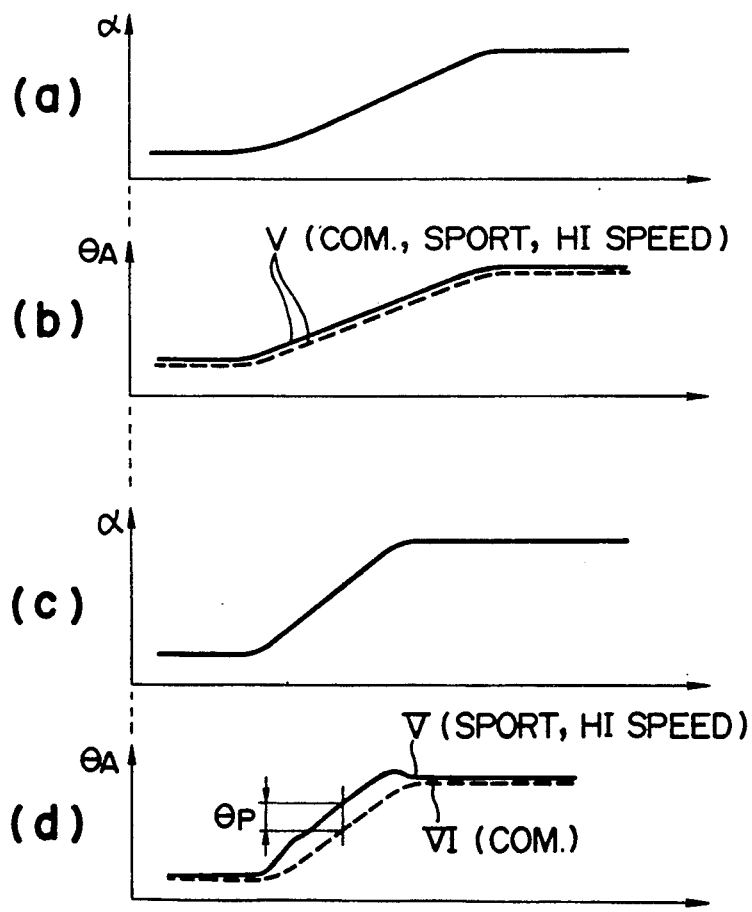
F I G. 7B

INTEGRATED CONTROL SYSTEM FOR STEERING AND POWER UNIT

BACKGROUND OF THE INVENTION

1. Field of the Invention

The present invention relates to an integrated control system for controlling steering and a power unit for use in a four-wheel steering vehicle in which the front wheels are steered while the rear wheels are turned.

2. Description of the Related Art

In the conventional four-wheel steering techniques, in a case where the rear wheels are turned in connection with the steering of the front wheels, the rear wheels are turned at an angle on the basis of the rear-wheel turning angle characteristics relative to the angle of the front wheels which are set beforehand and in accordance with the front-wheel steering angle. The four-wheel steering techniques which employ the rear-wheel turning angle characteristics that can be adequately corrected have been proposed in, for example, Japanese Patent Laid-Open NO. 61-220972. In this four-wheel steering technique, the rear-wheel turning angle characteristics are manually corrected in an in-phase direction when the speed of the vehicle is low so as to achieve improvement in the ease with which the vehicle can be turned. Correction of the rear-wheel turning angle characteristics in the in-phase direction means to correct the rear-wheel turning angle in a direction in which it increases when the speed of the vehicle remains the same.

The conventional four-wheel steering techniques in which the turning angle characteristics are automatically changed by the vehicle have been disclosed in, for example, U.S. Pat. No. 4,733,878. In this technique, the frictional coefficient of the surface of a road on which the vehicle is running is determined, and the turning angle characteristics are changed on the basis of the results of the determination.

In the four-wheel steering vehicles, the turning angle characteristics are corrected because they greatly affect the driving property of the vehicle.

Other factors which affect the driving property of the vehicle include the throttle opening characteristics. Recently, throttle valves of the type which are not mechanically connected to an accelerator pedal but are electrically driven by a pulse motor or the like have been widely used. Such electronic throttle valve control techniques are also disclosed in, for example, U.S. Pat. Nos. 4,508,078 and 4,729,356. U.S. Pat. No. 4,508,078 is directed to improvement of the response of an acceleration during acceleration of the vehicle. In this technique, a degree at which the accelerator pedal is depressed is detected. When this degree exceeds a predetermined value, the throttle valve is controlled such that a ratio of the changes in the throttle valve to the changes in the accelerator pedal increases. U.S. Pat. No. 4,508,078 is also directed to improvement of the response of a vehicle speed without deteriorating the acceleration, which is required when the vehicle is started or when the speed of the vehicle is decreasing. In order to achieve this, a desired opening of the throttle valve relative to the amount in which the accelerator pedal is operated is calculated in U.S. Pat. No. 4,508,078, and the throttle valve is controlled such that it is opened at the calculated desired opening. While the vehicle is being accelerated, the desired throttle valve opening is increased, and is then gradually decreased to the calculated desired opening within a predetermined period of time. Furthermore, the predetermined period of time is varied with the conditions under which the vehicle is driven for the purpose of improving the response of the vehicle speed.

Thus, it has been attempted to change the driving property of the four-wheel steering vehicle by correcting the turning angle characteristics in Japanese Patent Laid-Open No. 61-220972 and U.S. Pat. No. 4,733,878. In U.S. Pat. Nos. 4,508,078 and 4,729,356, changes of the driving property of the vehicle by means of the correction of the throttle opening characteristics relative to the opening of the accelerator pedal have been proposed. In other words, in a case where the rear-wheel turning angle characteristics are corrected in the four-wheel steering vehicle, correction of the rear-wheel turning angle characteristics and the throttle valve opening control relative to the amount in which the accelerator pedal is operated are performed independently and separately in the conventional four-wheel steering vehicle.

SUMMARY OF THE INVENTION

An object of the present invention is to provide a control system in which the turning angle characteristics correction control and the throttle valve opening control are related with each other so as to allow the driving property of a vehicle to be improved by means of, for example, the judgment of a driver or on changes in the environment in which the vehicle is running.

To achieve this object, the present invention provides a control system for integrally controlling steering and a power unit of a vehicle, comprising front-wheel steering means for steering the front wheels of the vehicle in connection with the operation of a steering rear-wheel turning means for turning the rear wheels cf the vehicle in connection with steering of the from the wheels and on the basis of a first characteristic representing the relation between a steering angle of the front wheels and a turning angle of the rear wheels, adjustment means for adjusting an engine output of the vehicle, detection means for detecting an amount in which an accelerator member is operated, driving means for driving said engine output adjustment means on the basis of a second characteristic representing the relation between the amount in which the accelerator member is operated and an amount in which said engine output adjustment means is driven, storage means for storing a plurality of the first characteristics and a plurality of the second characteristics, as well as a plurality of combinations of the first and second characteristics, each combination consisting of an arbitrary one of the plurality of the first characteristics and an arbitrary one of the plurality of the second characteristics, instruction means for giving an instruction of selection of a combination of a particular first characteristic and a particular second characteristic among said plurality of the combinations, and driving means for driving in response to said instruction said rear-wheel turning means on the basis of said particular first characteristic as well as said driving means on the basis of said particular second characteristic.

In this integrated control system, the rear-wheel turning angle control and the engine output control can be organically and integrally performed. That is, the first and second characteristics in an arbitrary one of the plurality of preset combinations which are set beforehand can be selected by an instruction given by a driver or the like.

The present invention further provides a control system for integrally controlling steering and a power unit of a vehicle, comprising front-wheel steering means for the steering front wheels of the vehicle in connection with an operation of a steering handle, rear-wheel turning means for turning the rear wheels of the vehicle in connection with steering of the front wheels, adjustment means for adjusting an engine output of the vehicle, first detection means for detecting an amount in which an accelerator member is operated, driving means for driving said engine output adjustment means in response to said amount in which said accelerator member is operate, second detection means for detecting either an instruction given by a driver who wants to change a travel characteristic or changes in an environment in which said vehicle is running, and change/correction means for changing or correcting a control characteristic which controls said rear-wheel turning means and said driving means in response to an output of said second detection means.

In the integrated control system, the rear-wheel turning angle control and the engine output control can be organically and integrally performed. That is the rear-wheel turning angle control characteristics and the engine output adjustment characteristics can be organically changed/corrected by means of the changes in the environment or the instruction given by the driver.

According to an aspect of the present invention, the first characteristic is a ratio of the turning angle of the rear wheels to the steering angle of the front wheels.

According to another aspect of the present invention, the adjustment means is a throttle valve, and the second characteristic is a desired speed at which the throttle valve is opened/closed or a ratio of a target opening of the throttle valve relative to the amount in which the accelerator member is operated.

According to yet another aspect of the present invention, a turning angle characteristic newly selected by the instruction means is characterized in that the rear wheels are turned further in an out-of-phase direction relative to the front wheels than in a previous turning angle characteristic, whereas a target opening/closing speed characteristic newly selected by the instruction means is characterized in that it takes a larger value relative to the same amount in which the accelerator member is operated than in a previous desired opening/closing speed characteristic. In this way, the ease with which the vehicle is turned is improved and the response of the engine output to the operation of the accelerator pedal (acceleration performance) is quickened. Such a setting is useful on the travel on a rally or the like.

According to further aspect of the present invention, a turning angle characteristic newly selected by the instruction means is characterized in that the rear wheels are turned further in an in-phase direction relative to the front wheels than in a previous turning angle characteristic, whereas a target opening/closing speed characteristic newly selected by the instruction means is characterized in that it takes a larger value relative to the same amount in which the accelerator member is operated than in a previous target opening/closing speed characteristic. In this way, a stable posture of the vehicle is ensured, and at the same time a high response of the engine output relative to the operation of the accelerator pedal is obtained. Such a setting is useful on the travel on a freeway.

According to further aspect of the present invention, selection or instruction of a characteristic is performed by means of a manually operated switch having a plurality of positions to which the switch is set.

According to further aspect of the present invention, selection or instruction of a characteristic is automatically performed by means of the detection of a resistance of a surface of a road on which the vehicle is running.

According to further aspect of the present invention, changes in the control characteristic are inhibited or performed, depending on the time variations in the amount in which the accelerator pedal is operated.

BRIEF DESCRIPTION OF THE DRAWINGS

FIG. 1 illustrates a block diagram of a hardware configuration of an integrated control system which are employed in first and second embodiments of the present invention;

FIG. 7A illustrates a graph in which time variations in the opening of the accelerator pedal and in the opening of the throttle valve in the first embodiment are plotted; and FIG. 7B illustrates graphs in which time variations in the opening of the accelerator pedal and in the opening of the throttle valve in the second embodiment are plotted.

DESCRIPTION OF THE PREFERRED EMBODIMENTS

Figure 2:
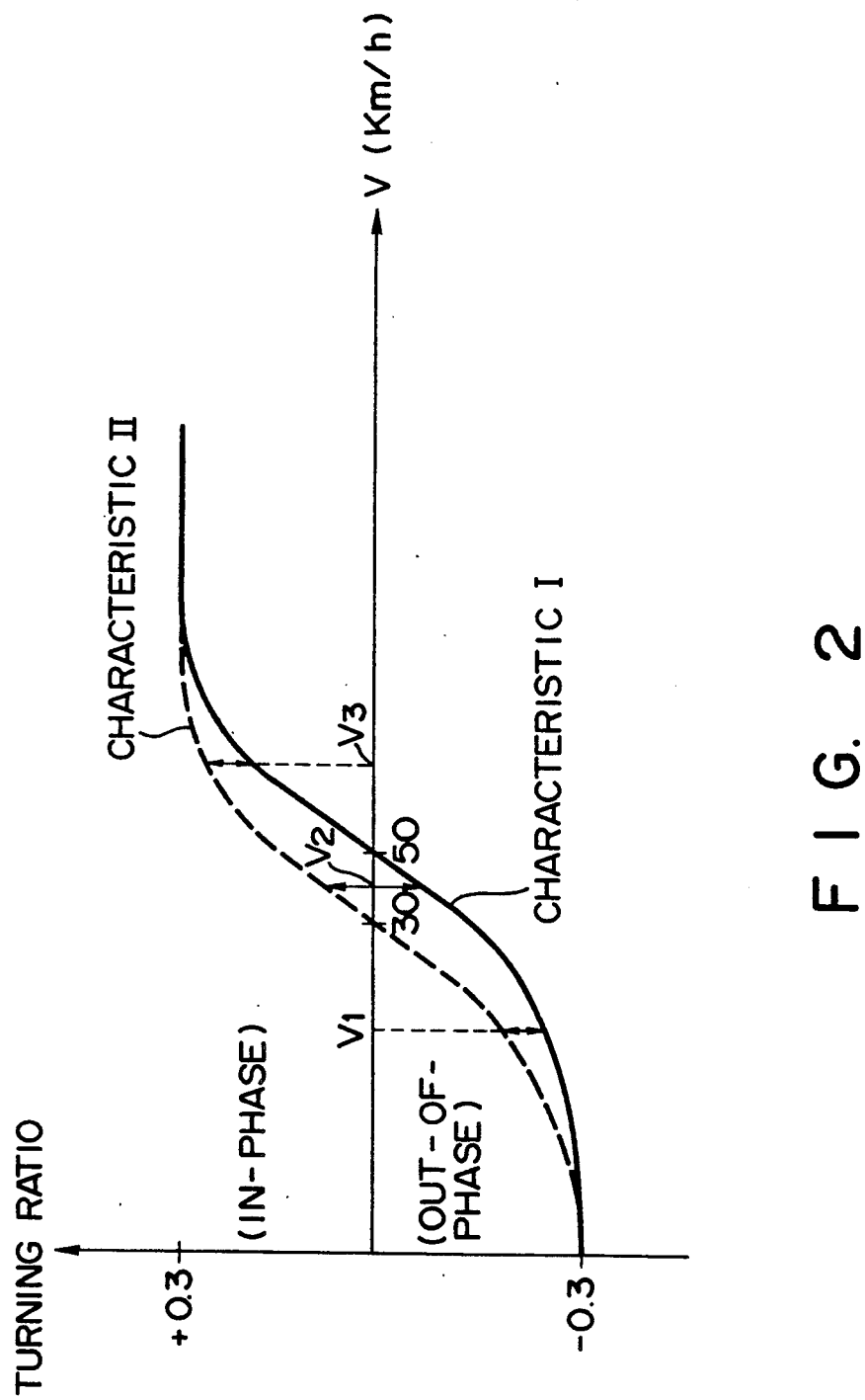
FIG. 2 illustrates a graph showing the turning angle characteristics which are employed in the control carried out in the first and second embodiments.

Two embodiments and one modified example of an integrated steering and a power unit control system according to the present invention will be described below. In the present embodiments, a gasoline engine as provided as a power unit, and a throttle valve is provided as an engine output adjustment means. A first characteristic represents a ratio $R_S$ of the turning angle of the rear wheels to the steering angle of the front wheels, and a second characteristic represents a desired opening/closing speed of the throttle valve relative to an opening $\alpha$ of the accelerator pedal. Change or selection respective ones of the first and second characteristics is performed by means of a manual switch.

HARDWARE CONFIGURATION

FIG. 1 is a block diagram of the hardware configuration of an integrated control system which is commonly used in first, second embodiments and a modified example.

In FIG. 1, right and left front wheels 1L and 1R are connected with each other by way of a front wheel turning mechanism 3, and right and left rear wheels 2L and 2R are coupled with each other by way of a rear-wheel turning mechanism 4.

The front wheel turning mechanism 3 will be briefly described. The front wheel turning mechanism 3 includes a pair of knuckle arms 4L and 4R, a pair of tie rods 5L and 5R, and a front wheel turning rod 6 which connects the tie rods 5L and 5R with each other. A pinion 9 provided at the lower end of a shaft 8 of a steering wheel 7 is in engagement with a rack 10 formed on the front wheel turning rod 6, and the front wheel turning rod 6 is moved by operating the steering wheel 7 by virtue of the engagement of the rack 10 with the pinion 9, by means of which the front wheels 1L and 1R are turned.

The rear wheel turning mechanism 4 will be described below. Like the front wheel turning mechanism 3, the rear wheel turning mechanism 4 includes a pair of knuckle arms 13L and 13R, a pair of tie rods 14L and 14R, and a rear wheel turning rod 15. A reduction gear 16 is coupled to the rear wheel turning rod 15. The reduction gear 16 is also connected to an output shaft 17a of a servo motor 17. Rotation of the servo motor 17 is converted to the motion of the rod 15 by means of the reduction gear 16. Movement of the rear wheel turning rod 15 causes turning of the rear wheels 2L and 2R. An electromagnetic brake 20 is disposed on the output shaft 17a of the servo motor 17. The operation of the electromagnetic brake 20 locks the motor output shaft 17a and the rear wheel turning rod 15, and thereby maintains the rear wheels 2L and 2R in their turned state.

An electromagnetic clutch 21 is disposed between the output shaft 17a of the serve motor 17 and the reduction gear 16, and a position resetting mechanism 22 for returning the turning rod 15 to its neutral position is disposed on the rear wheel turning rod 15. Both the electromagnetic clutch 21 and the position returning mechanism 22 are fail-safe mechanisms. More specifically, in a rear wheel steering emergency, the electromagnetic clutch 21 is operated so as to disconnect the servo motor 17 from the rear wheel turning rod 15, and the rear wheel turning rod 15 is then returned to its neutral position by the position returning mechanism 22 so as to position the rear wheels 2L and 2R at a neutral position where the steering angle thereof is zero.

A controller 30 is the center of an integrated control system of this embodiment which integrally performs control of the turning angle of the rear wheels and control of the opening of a throttle valve 50 (these controls being described in detail later).

In FIG. 1, a throttle valve 50 is disposed in an air suction passage 51 of the engine installed on the vehicle so as to adjust the amount of air to be sucked. The throttle valve 50 is not mechanically connected to an accelerator pedal 52 and is electrically driven by a throttle actuator 53 which may be a pulse motor. The actuator 53 is controlled by a control signal $P_T$ which is sent from the controller 30. The actual opening $\theta_A$ of the throttle valve 50 is detected by an opening sensor 55. An acceleration opening sensor 54 for detecting an opening $\alpha$ (amount in which an accelerator pedal is operated) is provided on the accelerator pedal 52. The detection signal of the acceleration opening sensor 54 is input to the controller 30.

The controller 30 receives detection signals from various types of sensors for control of the rear wheel steering. A sensor 35 detects an amount in which the steering wheel 7 is rotated. A sensor 36 detects an amount $\theta_F$ in which the front wheels are steered by means of an amount in which the rod 6 is moved. Two sensors 37 and 38 detect a vehicle speed V. A sensor 43 detects a rotational angle of the servo motor 17. A sensor 44 detects an amount $\theta_R$ in which the rear wheels are turned by means of an amount in which the rod 15 is moved.

A switch 39 is a neutral clutch switch which detects the neutral position of a manual transmission and depression of the clutch pedal. Where the transmission is automatic, an inhibitor switch 40 detects neutral and parking positions of the transmission. A brake switch 41 detects depression of a brake pedal. An engine switch 42 detects the operation of an engine. A sensor 46 detects a road surface resistance, details of which is disclosed in U.S. Pat. No. 4,733,878.

TRAVEL CONTROL PATTERNS

Travel patterns obtained in the first and second embodiments will be described below.

Figure 3A:
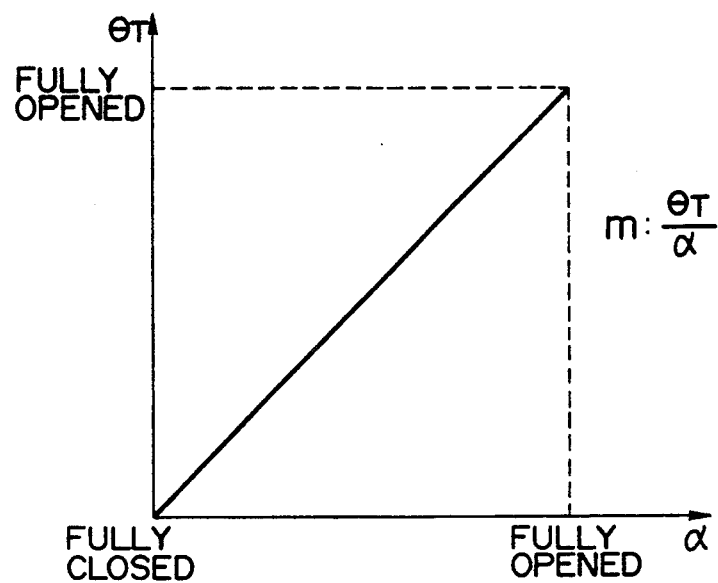
FIG. 3A illustrates a graph showing the relation between a target throttle opening $\theta_T$ and an amount $\alpha$ in which an accelerator pedal is operated, which is employed in the control carried out in the first and second embodiments.
Figure 3B:
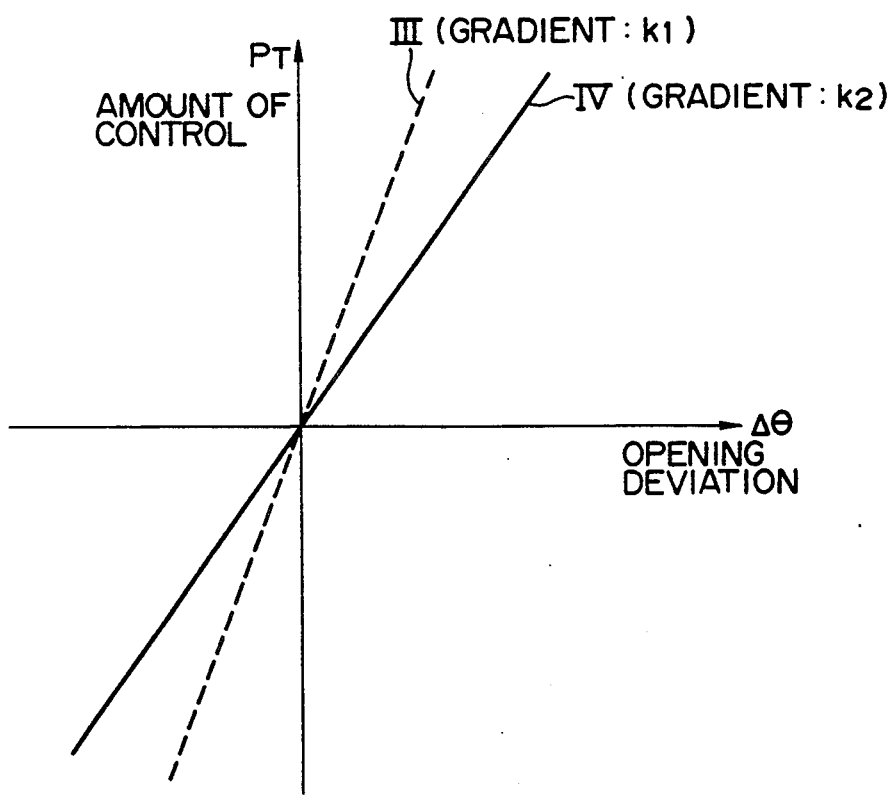
FIG. 3B illustrates a graph showing the relations between a throttle valve control signal $P_T$ and an opening deviation $\Delta\theta$, which are employed in the control carried out in the first embodiment.
Figure 4:
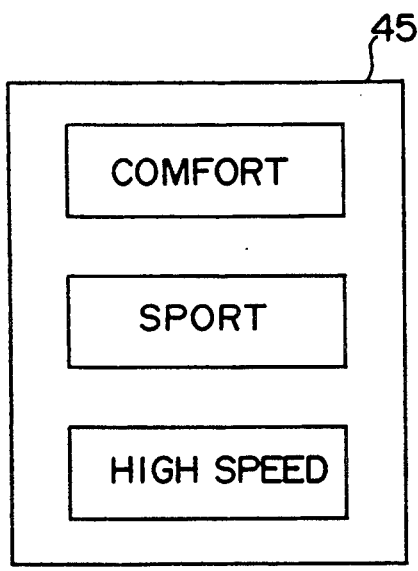
FIG. 4 illustrates positions of a manual switch to which the switch is set and which is employed in a case where the present invention is applied to an embodiment in which the characteristics are changed over by the manual operation.

In either of these two embodiments, two types of rear-wheel turning angle characteristics (which are denoted as characteristic curves I and II shown in FIG. 2) are prepared as first characteristics, and two different characteristics of the throttle opening relative to the amount in which the accelerator pedal is operated (which characteristics are denoted as characteristic curves III and IV shown in FIG. 3B) are prepared. Any combination can be selected from various combinations of these two types of characteristics by manually operating a switch 45. The switch 45 is positioned to any of three positions, including "SPORT", "COMFORT" and "HIGH SPEED", as shown in FIG. 4. Once the switch 45 is positioned to "SPORT", "COMFORT" or "HIGH SPEED", a corresponding combination of the rear wheel turning angle ratio characteristic and the throttle opening characteristic is selected from various combinations shown in a table which will be described later. It will become clear from the following description that travel characteristics which could not be obtained in the conventional four-wheel steering vehicle can be obtained by virtue of the selection of a particular combination of the rear wheel turning angle characteristic and the throttle characteristic.

Before the individual travel characteristics obtained by positioning the switch 45 to the corresponding positions are described, rear wheel turning angle characteristics I and II and throttle control characteristics III and IV will be explained first.

FIG. 2 is a graph showing curves representing two turning ratio characteristics which are stored in the controller 30. Here, the turning ratio denotes a ratio of the rear wheel turning angle $\theta_R$ relative to the front wheel turning angle $\theta_F$, and is defined as $\theta_R/\theta_F$. In other words, once the turning angle ratio and the steering angle $\theta_F$ of the front wheels are determined, the turning angle $\theta_R$ of the rear wheels is automatically determined. A steering angle $\theta_F$ of the front wheels is proportional to a steering angle $\theta_H$ of the steering handle, and is detected by the sensor 36. The turning angle $\theta_R$ of the rear wheels which is determined by the front wheel turning angle $\theta_F$ and the turning angle ratio is output from the controller 30 to the servo motor 17 as a control signal $P_R$.

In any of the characteristics shown in FIG. 2, the turning angle ratio $(\theta_R/\theta_F)$ varies with the vehicle speed. In other words, even if the steering wheel remains at the same angle, as the vehicle speed increases, the turning angle ratio also changes from an out-of phase state to an in-phase state in a certain range of the vehicle speed. The out-of phase state of the turning angle ratio means a state where the sign of the turning angle ratio is negative, i.e., a state where the front and rear wheels are directed in opposite directions relative to the forward direction of the vehicle. The in-phase state of the turning angle ratio means a state where the sign of the turning angle ratio is positive, i.e., a state where the front and rear wheels are directed in the same direction with respect to the forward direction of the vehicle.

Comparing the characteristic curves I and II which are denoted by solid and broken lines respectively in FIG. 2, the turning angle ratio according to the characteristic II deviates in the "in-phase direction" from the turning angle according to the characteristic I at the same vehicle speed. More specifically, if while the vehicle is kept at a speed of 30 km/h the travelling condition changes from the characteristic II to I, the turning angle ratio is zero under characteristic II, whereas the turning angle ratio is in an out-of-phase state under characteristic I. In other words, if the characteristic I is selected, the ease with which the vehicle is turned is improved.

Here, the phrase that the turning angle ratio is "corrected (changed) in the in-phase direction" or the phrase that the turning angle ratio is "corrected (changed) in the out-of-phase direction" are defined as follows: In FIG. 2, when the vehicle speed is $V_2$ and when the curve I is selected as a turning angle ratio characteristic, the turning angle ratio is in the out-of-phase state. In that state, if the turning angle characteristic is changed from the characteristic curve I to the characteristic curve II, the turning angle ratio becomes in the in-phase state. This correction of the turning angle ratio in a direction in which it is increased is "the correction (change) of the turning angle ratio in the in-phase direction." Reversely, if the turning angle characteristic is changed from the characteristic curve II to the characteristic curve I while the vehicle is kept running at the speed $V_2$, the turning angle is decreased, and this correction is called "correction (change) of the turning angle ratio in the out-of-phase direction." If the turning angle characteristic is changed from the curve I to the curve II while the vehicle is kept running at a speed of $V_1$, the turning angle ratio characteristic remains in the out-of-phase state. However, since the turning angle ratio is increased in that case, it is also called "correction (change) of the turning angle ratio in the in-phase direction." Similarly, if the characteristic curve is changed from curve II to I while the vehicle is kept running at a speed of $V_3$, the turning angle ratio remains in the in-phase state. However, this correction is called "correction (change) in the out-of-phase direction."

Next, two types of throttle opening control characteristics III and IV which are stored in the controller 30 will be described with reference to FIGS. 3A and 3B.

FIG. 3A is a graph, showing a characteristic curve of a target opening $\theta_T$ of the throttle valve relative to an opening $\alpha$ of the accelerator pedal. As shown in FIG. 3A, the target opening $\theta_T$ of the throttle valve increases as the opening $\alpha$ of the accelerator pedal increases. In this embodiment, $\theta_T$ and $\alpha$ have a linear relationship, and is expressed by $$\theta_T = m \cdot \alpha \tag{1}$$

FIG. 3B is a graph showing relations between the deviation $\Delta\theta (= \theta_T - \theta_A)$ between the target opening $\theta_T$ and the actual opening $\theta_A$ of the throttle valve (which is detected by the sensor 55) and control signal $P_T$ which is output to the throttle actuator 53. In FIG. 3B, the characteristic III is expressed by $$P_T = k_1 \cdot \Delta\theta \tag{2}$$

and the characteristic IV is expressed by $$P_T = k_2 \cdot \Delta\theta \tag{3}$$

where $k_1 > k_2$. In the characteristic III, the control signal $P_T$ has a larger value than that obtained in the characteristic IV relative to the same deviation $\Delta\theta$. In other words, in the characteristic III, the speed at which the throttle valve is opened or closed is higher than that obtained in the characteristic IV.

Figure 3C:
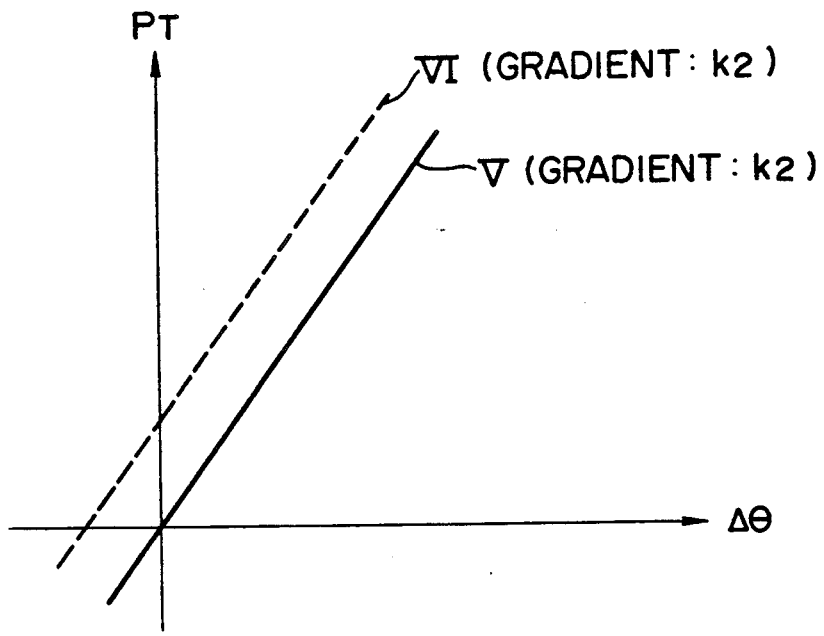
FIG. 3C shows a graph showing the relations between a throttle valve control signal $P_T$ and an opening deviation $\Delta\theta$, which are employed in the control carried out in the second embodiment.

Control conducted in the second embodiment differs from that performed in the first embodiment in the throttle control. FIG. 3C is a graph showing the characteristic curves of the throttle control which is carried out in the second embodiment. There are two types of throttle control characteristics (V and VI) available in the second embodiment, as in the case of the first embodiment. The characteristic VI is the throttle control characteristic obtained by correcting the characteristic V in the direction of a higher gain. The characteristic V is expressed by:

$$P_T = l \cdot \Delta\theta \tag{4}$$

and the characteristic VI is expressed by:

$$P_T = l \cdot (\Delta\theta + \theta_P) \tag{5}$$

where $\theta_P$ is a correction constant for the characteristic VI.

Table 1 shows combinations of the turning angle ratio characteristic curves I and II and the throttle valve control characteristics III and IV, which are employed in the first embodiment, and Table 2 shows combinations of the turning angle ratio characteristic curves I and II and the throttle valve control characteristics V and VI, which are employed in the second embodiment.

TABLE 1

| Switch Position | Turning Angle Ratio Control Characteristics | Throttle Valve Control Characteristics |
| --- | --- | --- |
| COMFORT | II | IV |
| SPORT | I | III |
| HIGH SPEED | II | III |

TABLE 2

| Switch Position | Turning Angle Ratio Control. Characteristics | Throttle Valve Control Characteristics | |
| --- | --- | --- | --- |
| | | $\frac{d\alpha}{dt} \leq TH$ | $\frac{d\alpha}{dt} > TH$ |
| COMFORT | II | V | V |
| SPORT | I | V | VI |
| HIGH SPEED | II | V | VI |

As is clear from Table 1, the control carried out in the first embodiment is characterized in that, when a driver selects a desired position of the switch 45 and, hence, the desired travel characteristics of the vehicle, a combination of the turning angle ratio control characteristic and the throttle valve control characteristic, which has been set beforehand in accordance with the selected position, is selected, and in that the rear wheel turning angle control as well as the throttle valve control is carried out in accordance with the selected control characteristics.

Furthermore, as is clear from Table 2, the throttle valve opening control which is carried out in the second embodiment is changed by time variations ($=d\alpha/dt$) in an amount in which the accelerator pedal is operated. The throttle valve opening control characteristics are changed when the switch 45 is at a particular position (SPORT or HIGH SPEED) and when the time variations in the amount in which the accelerator pedal is operated is greater than a predetermined value.

Individual control patterns for the first embodiment which are shown in Table 1 will be described below in detail.

Normally, a driver selects COMFORT. When the manual switch 45 is positioned at COMFORT, the turning angle ratio characteristic II and the throttle valve control characteristic IV are selected. While the rear wheel turning angle characteristic II is being selected, the four-wheel steering control is maintained. However, turning of the rear wheels is corrected further in the in-phase direction relative to the front wheels than in the characteristic I, that is, the rear wheels are less turned relative to the front wheels. Concurrently with the change of the turning angle ratio, the throttle valve control characteristic IV is selected, by means of which the target opening of the throttle valve 50 is set to its normal value while the speed at which the throttle valve 50 is opened and closed becomes slow. As a result, the throttle valve 50 is operated relatively slowly. Thus, when the switch 45 is positioned at COMFORT, stable travel is ensured because the ease with which the vehicle is turned is maintained and because smooth acceleration of the engine is achieved due to the mild throttle control characteristic. It is, however, to be noted that the ease with which the vehicle is turned is rather low because of the selection of the characteristic II.

As the switch 45 is switched over from COMFORT to SPORT, the turning angle ratio characteristic I and the throttle control characteristic III are selected. As the turning angle characteristics are changed from the characteristic II to the characteristic I, the rear wheel turning angle characteristic is corrected in the out-of-phase direction. Furthermore, concurrently with the change of the turning angle characteristic, the control characteristic of the throttle actuator 53 relative to the amount α in which the accelerator pedal is operated are changed from the characteristic IV to the characteristic III, by means of which the gain of the control signal $P_T$ is set to a higher value. In practice, the ease with which the vehicle is turned is improved and the direction of the vehicle can be thereby changed quickly. This is necessary when the vehicle travels on a winding road or the like. Furthermore, the target opening of the throttle valve 50 is set to a large value while the speed at which the throttle value 50 is opened and closed becomes fast. In consequence, the response of the throttle valve 50 to the operation of the accelerator pedal is quickened, and the response of changes in an engine torque relative to the operation of the acceleration pedal is quickened. As a result, the vehicle can be driven briskly when it is travelled on a winding road or the like.

As the manual switch 45 is switched over from COMFORT to HIGH SPEED, the throttle control characteristic is changed from the characteristic IV to the characteristic III while the rear wheel turning angle characteristic remains the same. As the manual switch 45 is switched over from SPORT to HIGH SPEED, the rear wheel turning angle characteristic is changed from the characteristic I to the characteristic II while the throttle control characteristic remains the same. The fact that the driver has selected HIGH SPEED means that he is driving at a high speed or that the driver is going to accelerate the vehicle and drive it at a high speed, e.g., that he is driving on an expressway. While the vehicle is running at a high speed, stability of the vehicle and a high acceleration performance are required. Stability of the vehicle is necessary when the vehicle changes a lane and a high acceleration performance is required, for example, when vehicle has a near miss to another vehicle. As the turning angle ratio characteristic is changed to or maintained at the characteristic II, the turning angle of the rear wheels is corrected to or maintained in the in-phase direction. In consequence, tendency of so-called "under-steer" prevails, and the vehicle behaves stably when the steering wheel is turned. As the throttle control characteristic is changed to or maintained at the characteristic III, the throttle response is corrected to or maintained at a high value, and this allows the driver to escape from a dangerous state by the operation of the accelerator pedal.

CONTROL IN THE FIRST EMBODIMENT

Figure 5:
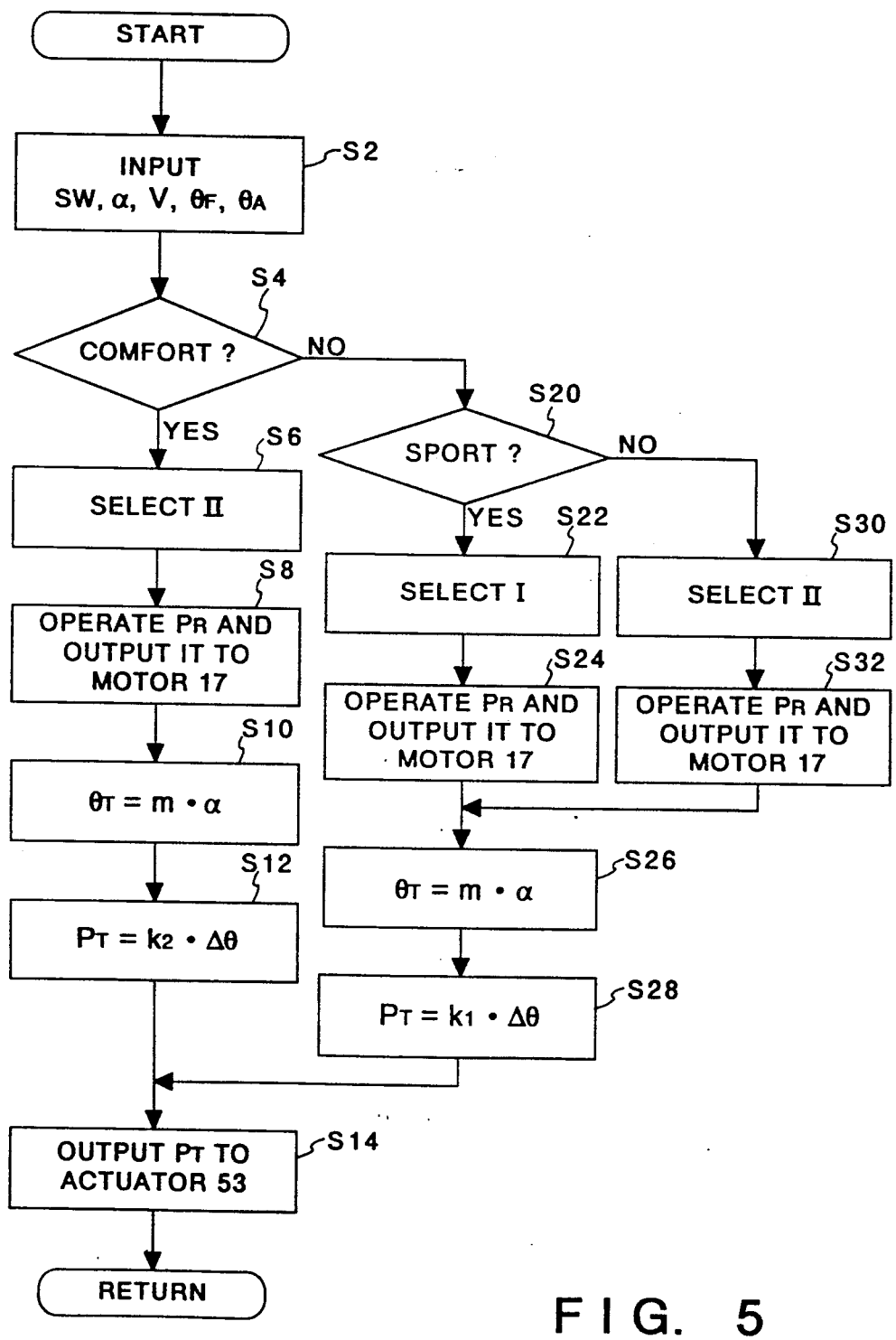
FIG. 5 shows a flowchart of the control procedures for the first embodiment.

Control executed in the first embodiment will be described below with reference to FIG. 5. The program represented by the flowchart of FIG. 5 is executed at a fixed period. Each time the program is executed, the position of the operation switch 45 is read, and the rear wheel turning angle characteristic and the throttle control characteristic, which correspond to that position, are selected. The control signal $P_R$ which controls the turning angle of the rear wheels is determined in accordance with the selected turning angle characteristic, and the throttle control signal $P_T$ is determined in accordance with the selected throttle control characteristic.

First, at step S2, the state of the switch 45, the opening α of the accelerator pedal, the vehicle speed V, the steering angle $\theta_F$ of the front wheels, and the opening $\theta_A$ of the throttle valve are read. Thereafter, the process goes to either step S6, S22 or S30, depending on the state of the switch 45. That is, if the switch 45 is at COMFORT, the process goes to step S6. If the switch 45 is at SPORT, the process goes to step S22. If the switch 45 is at HIGH SPEED, the process proceeds to step S30.

If it is determined that the switch 45 is at COMFORT, the turning angle ratio characteristic II is selected at step S6. Next, at step S8, a target turning angle $\theta_R$ of the rear wheels is calculated on the basis the characteristic II using the vehicle speed V and the front wheel steering angle $\theta_F$ which are read at step S2, the calculated target turning angle of the rear wheels is converted to a control signal $P_R$, and the converted control signal $P_R$ is output to the pulse motor 17. In the processing from step S10 to step S14, a throttle valve control is performed on the basis of the characteristic IV. More specifically, at step S10, a target throttle valve opening $\theta_T$ is calculated on the basis of Equation (1) using the amount $\alpha$ in which the accelerator pedal is operated. Equation (1) represents the characteristics shown in FIG. 3A. Next, at step S12, the speed at which the throttle valve is operated is calculated. In other words, at step S12, a control signal $P_T$ is calculated on the basis of Equation (3) representing the characteristic IV shown in FIG. 3B. At step S14, the signal $P_T$ is output to the throttle actuator 53. Thus, when the switch 45 is at COMFORT, an integral control is performed on the basis of the rear wheel turning control characteristic II and the throttle valve opening control characteristic IV.

If it is determined that the switch 45 is at SPORT, the turning angle characteristic I is selected at step S22. Next, at step S24, a target turning angle $\theta_R$ of the rear wheels is calculated on the basis the characteristic I using the vehicle speed V and the front wheel steering angle $\theta_F$, the calculated target turning angle of the rear wheels is converted to a control signal PR, and the converted control signal $P_R$ is output to the pulse motor 17. Thereafter, at step S26, a target throttle valve opening $\theta_T$ is calculated on the basis of Equation (1) using the amount $\alpha$ in which the accelerator pedal is operated. Next, at step S28, a control signal $P_T$ is calculated on the basis of Equation (2) representing the characteristic III shown in FIG. 3B. At step S14, the signal $P_T$ is output to the throttle actuator 53. Thus, when the switch 45 is at SPORT, an integral control is performed on the basis of the rear wheel turning control characteristic I and the throttle valve opening control characteristic III.

If it is determined that the switch 45 is at HIGH SPEED, the turning angle characteristic II is selected at step S30. Next, at step S32, a target turning angle $\theta_R$ of the rear wheels is calculated on the basis the characteristic II, the calculated target turning angle of the rear wheels is converted to a control signal $P_R$, and the converted control signal $P_R$ is output to the pulse motor 17. Thereafter, at step S26, a target throttle valve opening $\theta_T$ is calculated on the basis of Equation (1) using the amount $\alpha$ in which the accelerator pedal is operated. Next, at step S28, a control signal $P_T$ is calculated on the basis of Equation (2) representing the characteristic III shown in FIG. 3B. At step S14, the signal $P_T$ is output to the throttle actuator 53. Thus, when the switch 45 is at HIGH SPEED, an integral control is performed on the basis of the rear wheel turning control characteristic II and the throttle valve opening control characteristic III.

CONTROL IN THE SECOND EMBODIMENT

In the first embodiment, the throttle valve control characteristic has been determined by the position of the switch 45. In other words, in the first embodiment, changes in the throttle valve control characteristic is synchronized with the change in the position of the switch, whereas, in the second embodiment, the throttle valve control characteristic is changed by means of the operation of the accelerator pedal as well as by means of the position of the switch 45.

In the second embodiment, the rear wheel turning angle characteristics I and II are prepared as in the case of the first embodiment, and the relations between the positions of the switch 45 and the turning angle characteristics are the same as those in the first embodiment. Furthermore, two throttle valve control characteristics V and VI are prepared, as shown in FIG. 3C. However, a throttle valve control characteristic is changed by means of the operation of the accelerator pedal only when the switch 45 is either at SPORT or HIGH SPEED, as can be seen in Table 2. That is, when the speed ($=d\alpha/dt$) at which the accelerator pedal is operated is equal to or less than a predetermined threshold TH, i.e., $$\frac{d\alpha}{dt} \leq TH,$$

the throttle valve control characteristic V is selected regardless of the position of the switch 45, as can be seen from Table 2. On the other hand, if the speed at which the accelerator pedal is operated is greater than the threshold TH, i.e., $$\frac{d\alpha}{dt} > TH,$$

the characteristic V is selected when the switch 45 is at COMFORT, and the characteristic VI is selected when the switch 45 is at HIGH SPEED or SPORT. As stated above in conjunction with the graph of FIG. 3C, with respect to the throttle control based on the characteristic VI, the speed at which the throttle valve is operated is higher than that in the characteristic V. More specifically, the reason why the driver sets the switch 45 at HIGH SPEED or SPORT is to improve the response of the increase in the engine torque relative to the operation of the accelerator pedal. The characteristic VI being selected when the switch 45 is set to HIGH SPEED or SPORT, and when the speed at which the accelerator pedal is operated is high, fulfill the requirements of the driver.

Figure 6:
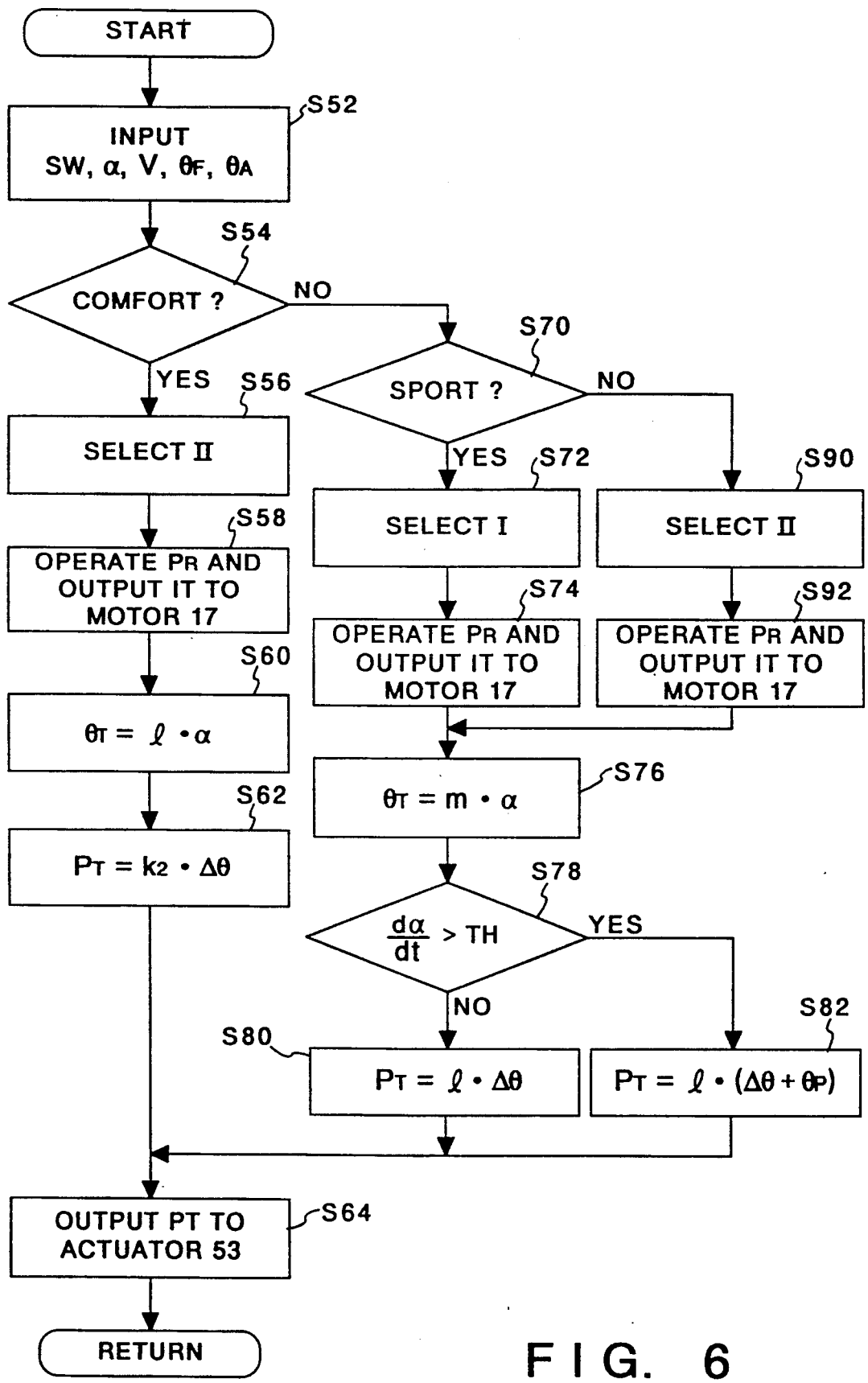
FIG. 6 shows a flowchart of the control procedures for the second embodiment.

FIG. 6 is a flowchart of the control procedures for the second embodiment, which differs from that shown in FIG. 5 in the processing from step S78 to S82. Other steps are the same except for minor points. In addition, l in Equation (4) at step S64 may be a constant which is the same as $k_1$ or $k_2$ at step S12 or S26.

Control executed in the second embodiment will be described below, the description being focused on the difference between the first and second embodiments. In a case where the switch 45 is at HIGH SPEED or SPORT, if it is determined at step S78 that the speed at which the accelerator pedal is equal to or higher than the threshold TH, the process goes to step S82 where the characteristic VI represented by Equation (5) is selected. If it is determined at step S78 that the speed at which the accelerator pedal is operated is lower than threshold TH, the process goes to step S80 where the characteristic V represented by Equation (4) is selected.

Thus, the integrated control system of the second embodiment is capable of the control executed in the first embodiment. Moreover, the motion characteristics and travel characteristics of the vehicle can be changed by means of the operation of the accelerator pedal.

FIGS. 7A and 7B are graphic presentations of the results of the throttle control performed in the first and second embodiments, respectively, relative to the amount α at which the accelerator pedal is operated. In FIGS. 7A and 7B, time variations of the actual opening $\theta_A$ of the throttle valve, which are obtained as the amount α at which the accelerator pedal is operated is increased with time, are plotted.

In the control shown in FIG. 7A (representing the control of the first embodiment shown in FIG. 5), when the switch 45 is at HIGH SPEED or SPORT at which the characteristic III is selected, opening of the throttle valve substantially follows the increase in the amount α at which the accelerator pedal is operated. However, when the switch 45 is at COMFORT at which the characteristic IV is selected, opening of the throttle valve tends to be delayed with respect to the operation of the accelerator pedal.

FIG. 7B shows the control of the second embodiment. FIG. 7B (a) shows a case where the amount in which the accelerator pedal is operated increases slowly, and FIG. 7B (c) shows a case where the amount in which the accelerator pedal is operated increases rapidly. In the control of the second embodiment, in a case where the amount α in which the accelerator pedal is operated increases slowly ($d\alpha/dt \leq TH$), even if the switch 45 is located at any position, the characteristic V is selected, as shown in FIG. 7B (b), and the throttle characteristics, i.e., the engine torque characteristics, remain the same. On the other hand, in a case where the amount in which the accelerator pedal is operated increases rapidly ($d\alpha/dt > TH$), if the switch 45 is either at HIGH SPEED or SPORT, the torque response to the operation of the accelerator pedal is improved, as shown in FIG. 7B (d).

MODIFIED EXAMPLE

Various modifications may be made without departing from the spirit and scope of the invention as set forth in the appended claims.

In the first and second embodiments, the driver selects the rear wheel turning angle characteristic and the throttle control characteristic by manually operating the switch 45, and the overall and integral control of the motion characteristics and the travel characteristics of the vehicle are thereby changed. In a modified example, the driving conditions are automatically detected by the vehicle, and the rear wheel turning characteristic and the throttle control characteristic which correspond to the selected driving condition are automatically selected by the vehicle, upon when the integral control of the motion characteristic and the travel characteristic are changed.

The above-described driving conditions to be detected include a resistance of the surface of a road. Techniques for detecting changes in the surface resistance are disclosed in, for example, U.S. Pat. No. 4,733,878. The surface resistance may be detected by the resistance sensor 46 in two stages (which exhibit larger and smaller values of the resistance respectively), and the control characteristics may be selected in accordance with the detected surface resistance, as shown in Table 3.

TABLE 3

| Driving Environment Conditions | Turning Angle Control Characteristics | Throttle Valve Control Characteristics |
|---|---|---|
| High Surface Resistance | I | III |
| Low Surface Resistance | II | IV |

A high surface resistance means that the force with which the road surface grips the wheels is high. In consequence, the rear wheel turning angle control characteristic I is selected and the rear wheel turning angle is thereby set in the out-of-phase direction so as to improve the ease with which the vehicle is turned. Furthermore, the throttle valve control characteristic III is selected so as to improve the response of the engine torque to the operation of the accelerator pedal. Thus, both the ease with which the vehicle is turned and the acceleration can be improved. As the surface resistance becomes low, the turning angle characteristics are changed to the characteristic II and the rear wheel turning angle is thereby corrected in the in-phase direction. Furthermore, the throttle valve control characteristic IV is selected and the response of the engine torque to the operation of the accelerator pedal is thereby slowed. These ensure a smooth acceleration and the tendency of under-steer and, hence, stable behavior of the vehicle.

The integrated control system according to the present invention can also be applied to a vehicle with an Diesel engine.

The present invention is characterized by combinations of rear wheel steering controls and throttle valve controls. However, the individual forms of the rear wheel steering controls and the individual forms of the throttle valve controls are not limited to the turning angle ratio control and the throttle valve opening speed control which are employed in the above-described embodiments. In other words, in the first and second embodiments, two different characteristics of the throttle valve opening speed ($P_T = k_1 \cdot \Delta\theta$ and $P_T = k_2 \Delta\theta$) are prepared as the throttle control characteristic patterns. However, two different characteristics of the target throttle valve opening (FIG. 3A) may be prepared.

Furthermore, the number of first characteristics which are employed in the rear wheel steering control and the number of second characteristics which are employed in the engine output adjustment control are not limited to two.

The invention may be embodied in other specific forms without departing from the spirit or essential characteristics thereof. The above-described embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A control system for controlling steering and a power unit of a vehicle, comprising:
   front-wheel steering means for steering the front wheels of the vehicle in connection with the operation of a steering handle;

rear-wheel turning means for turning the rear wheels of the vehicle in connection with steering of the front wheels and on the basis of a first characteristic representing the relation between a steering angle of the front wheels and a turning angle of the rear wheels;

adjustment means for adjusting an engine output of the vehicle;

detection means for detecting an amount in which an accelerator member is operated;

driving means for driving said engine output adjustment means on the basis of a second characteristic representing the relation between the amount in which the accelerator member is operated and an amount in which said engine output adjustment is driven;

storage means for storing a plurality of the first characteristics and a plurality of the second characteristics, as well as a plurality of combinations of the first and second characteristics, each combination consisting of an arbitrary one of the plurality of the first characteristics and an arbitrary one of the plurality of the second characteristics;

instruction means for selecting a combination of a particular first characteristic and a particular second characteristic among said plurality of the combinations; and driving means for driving in response to said instruction said rear-wheel turning means on the basis of said particular first characteristic as well as said driving means on the basis of said particular second characteristic.

2. The control system according to claim 1, wherein said first characteristic is a ratio of the turning angle of the rear wheels to the steering angle of the front wheels.

3. The control system according to claim 1, wherein said adjustment means is a throttle valve, and wherein said second characteristic is a target speed at which said throttle valve is opened and closed relative to the amount in which said accelerator member is operated.

4. The control system according to claim 1, wherein said adjustment means is a throttle valve, and wherein said second characteristic is a ratio of a target opening of said throttle valve to the amount in which said accelerator member is operated.

5. The control system according to claim 1, wherein said first characteristic is a ratio of the turning angle of the rear wheels to the steering angle of the front wheels, wherein said adjustment means is a throttle valve, and wherein said second characteristic is a ratio of a target opening of said throttle valve to the amount in which said accelerator member is operated.

6. The control system according to claim 4, wherein, in said particular first and second characteristics in the new combination selected by said instruction means, a turning angle characteristic newly selected by said instruction means is characterized in that the rear wheels are turned further in an out-of-phase direction relative to the front wheels than in a previous turning angle characteristic, whereas the target opening/closing speed characteristic newly selected by said instruction means is characterized in that it has a larger value relative to the same amount in which said accelerator member is operated than in a previous target opening/closing speed characteristic.

7. The control system according to claim 5, wherein, in said particular first and second characteristics in the new combination selected by said instruction means, a turning angle characteristic newly selected by said instruction means is characterized in that the rear wheels are turned further in an in-phase direction relative to the front wheels than in a previous turning angle characteristic, whereas the target opening/closing speed characteristic newly selected by said instruction means is characterized in that it has a larger value relative to the same amount in which said accelerator member is operated than in a previous target opening/closing speed characteristic.

8. The control system according to claim 1, wherein said instruction means includes a manually operated switch having a plurality of positions to which said switch is set, and means for detecting the position to which said switch is set by a driver.

9. The control system according to claim 1, wherein said instruction means includes means for detecting a resistance of a surface of a road on which said vehicle is running, and means for selecting one of combinations of said particular first characteristic and said second characteristic on the basis of the results of the detection.

10. The control system according to claim 5, wherein said means for detecting the amount in which said accelerator pedal is operated further includes a means for detecting time variations in the amount in which said accelerator pedal is operated, said control system further comprising:

an inhibiting means for inhibiting the operation of said instruction means in a case where a value of the time variations of the amount in which said accelerator member is operated, which is detected by said time variation detection means, is less than a predetermined threshold, said inhibiting means inhibits the operation of said instruction means when the target opening/closing speed newly selected by said instruction means is larger relative to the same amount in which said accelerator pedal is operated than a previous target opening/closing speed.

11. A control system for controlling steering and a power unit of a vehicle, comprising:

front-wheel steering means for the steering front wheels of the vehicle in connection with an operation of a steering handle;

rear-wheel turning means for turning the rear wheels of the vehicle in connection with steering of the front wheels;

adjustment means for adjusting an engine output of the vehicle;

first detection means for detecting an amount in which an accelerator member is operated;

driving means for driving said engine output adjustment means in response to said amount in which said accelerator member is operated;

second detection means for detecting either an instruction given by a driver who wants to change a travel characteristic or changes in an environment in which said vehicle is running; and change/correction means for changing or correcting a control characteristic, said characteristic being a combination of characteristics which control said rear-wheel turning means and said driving means in response to an output of said second detection means.

* * * * *

UNITED STATES PATENT AND TRADEMARK OFFICE
CERTIFICATE OF CORRECTION

PATENT NO. : 5,048,633
DATED : September 17, 1991
INVENTOR(S) : Shin Takehara et al.

It is certified that error appears in the above-identified patent and that said Letters Patent is hereby corrected as shown below:

Column 4, line 61:
"engine as" should be --engine is--;

Column 11, line 34:
"signal PR" should be --signal $P_R$--;

Column 15, line 15:
after "adjustment" insert --means--.

Signed and Sealed this

Eighth Day of June, 1993

Attest:

MICHAEL K. KIRK

Attesting Officer

Acting Commissioner of Patents and Trademarks